March 15, 1955 N. J. PAPADAKOS 2,704,128
TAIL ROTOR MOUNTING AND CONTROL
MEANS FOR ROTARY WING AIRCRAFT
Original Filed Feb. 8, 1947 8 Sheets-Sheet 1

INVENTOR
NICHOLAS J. PAPADAKOS
BY Robert E. Burns
ATTORNEY

March 15, 1955

N. J. PAPADAKOS 2,704,128

TAIL ROTOR MOUNTING AND CONTROL
MEANS FOR ROTARY WING AIRCRAFT

Original Filed Feb. 8, 1947

INVENTOR
NICHOLAS J. PAPADAKOS
BY
Robert E. Burns
ATTORNEY

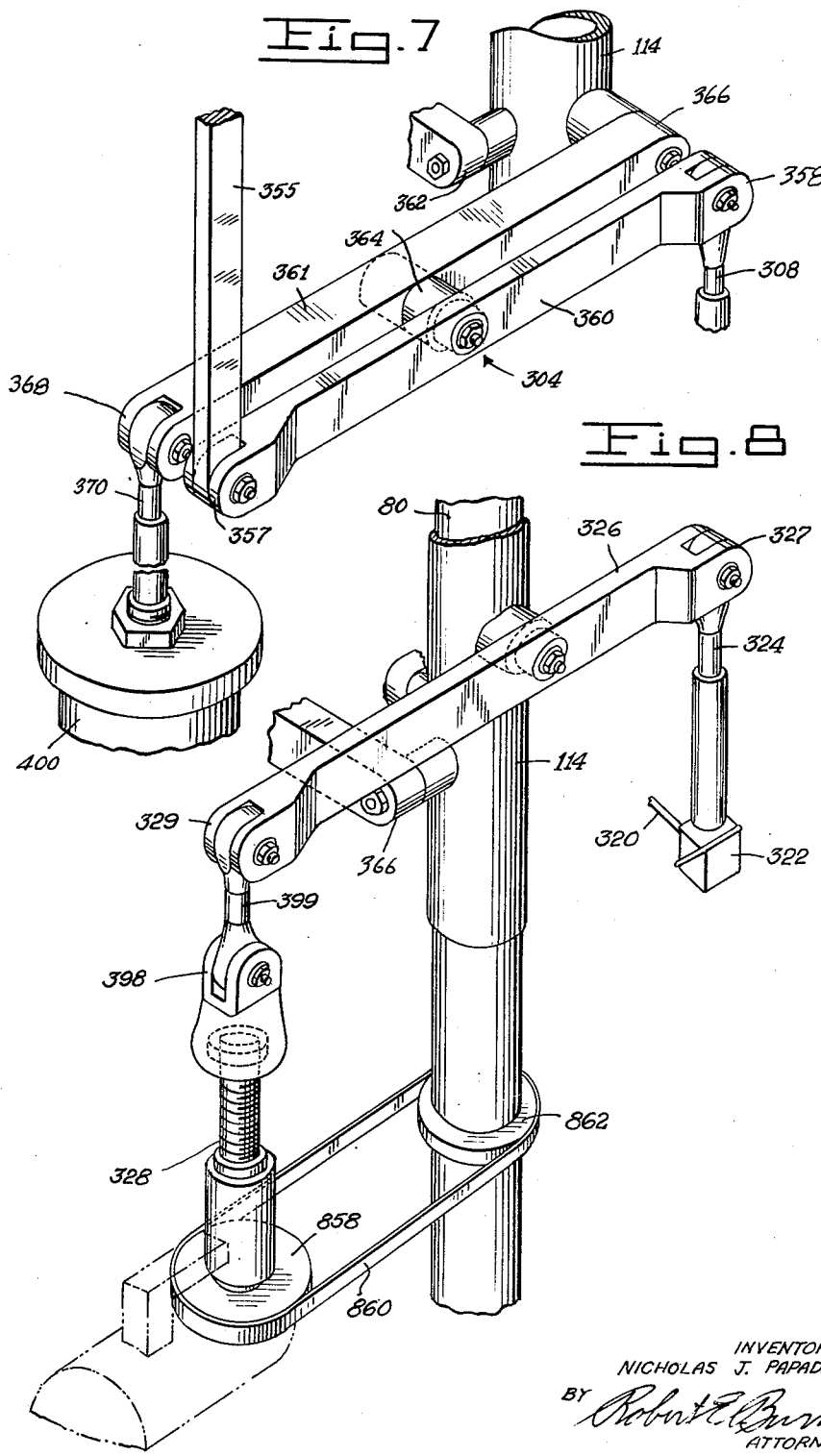

March 15, 1955   N. J. PAPADAKOS   2,704,128
TAIL ROTOR MOUNTING AND CONTROL
MEANS FOR ROTARY WING AIRCRAFT
Original Filed Feb. 8, 1947   8 Sheets-Sheet 7
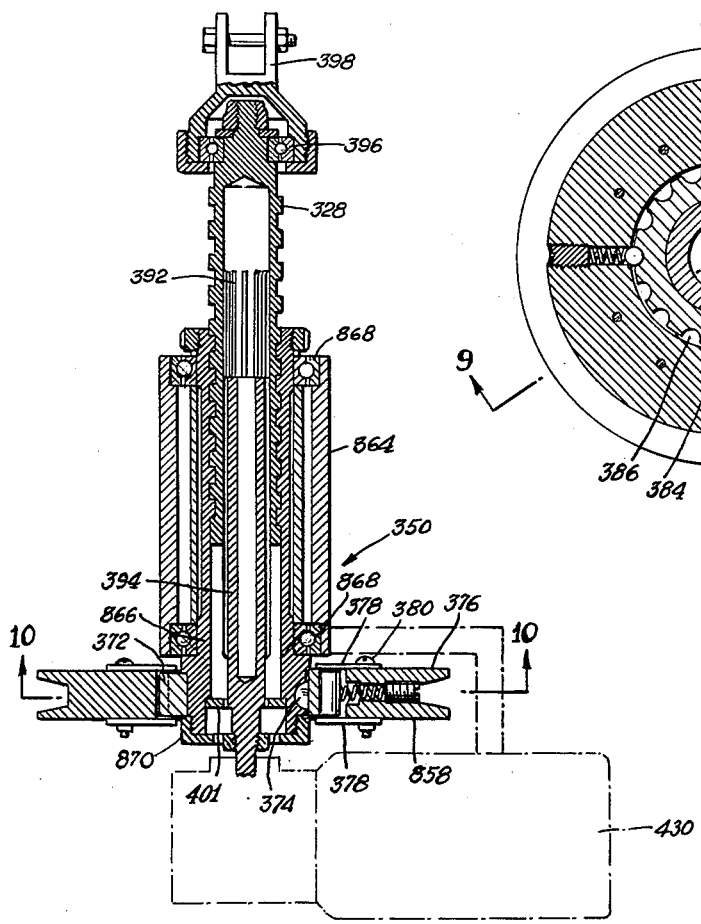
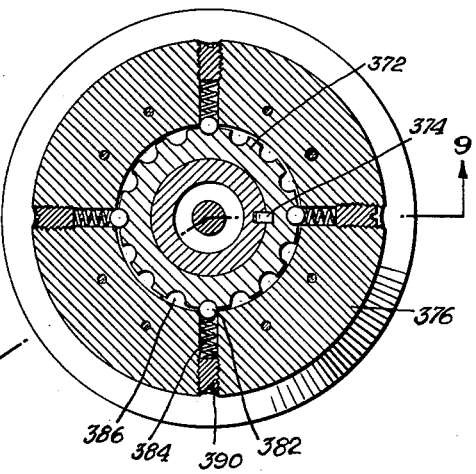
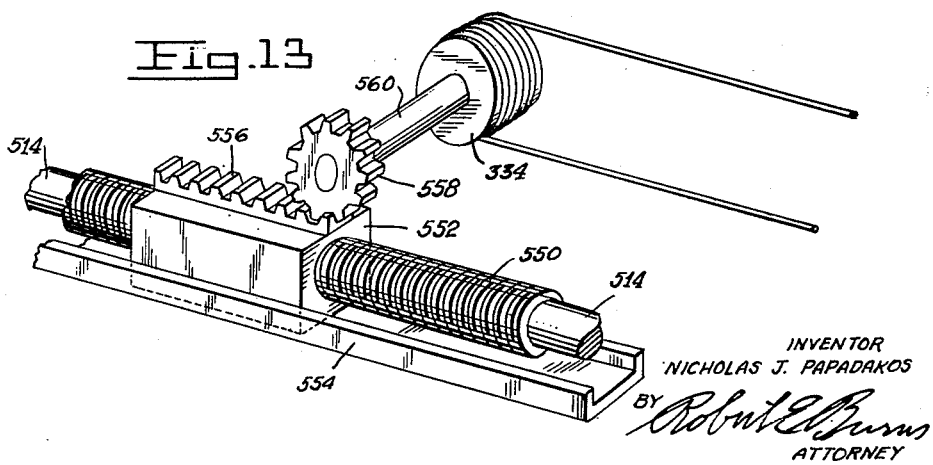
INVENTOR
NICHOLAS J. PAPADAKOS
BY
ATTORNEY

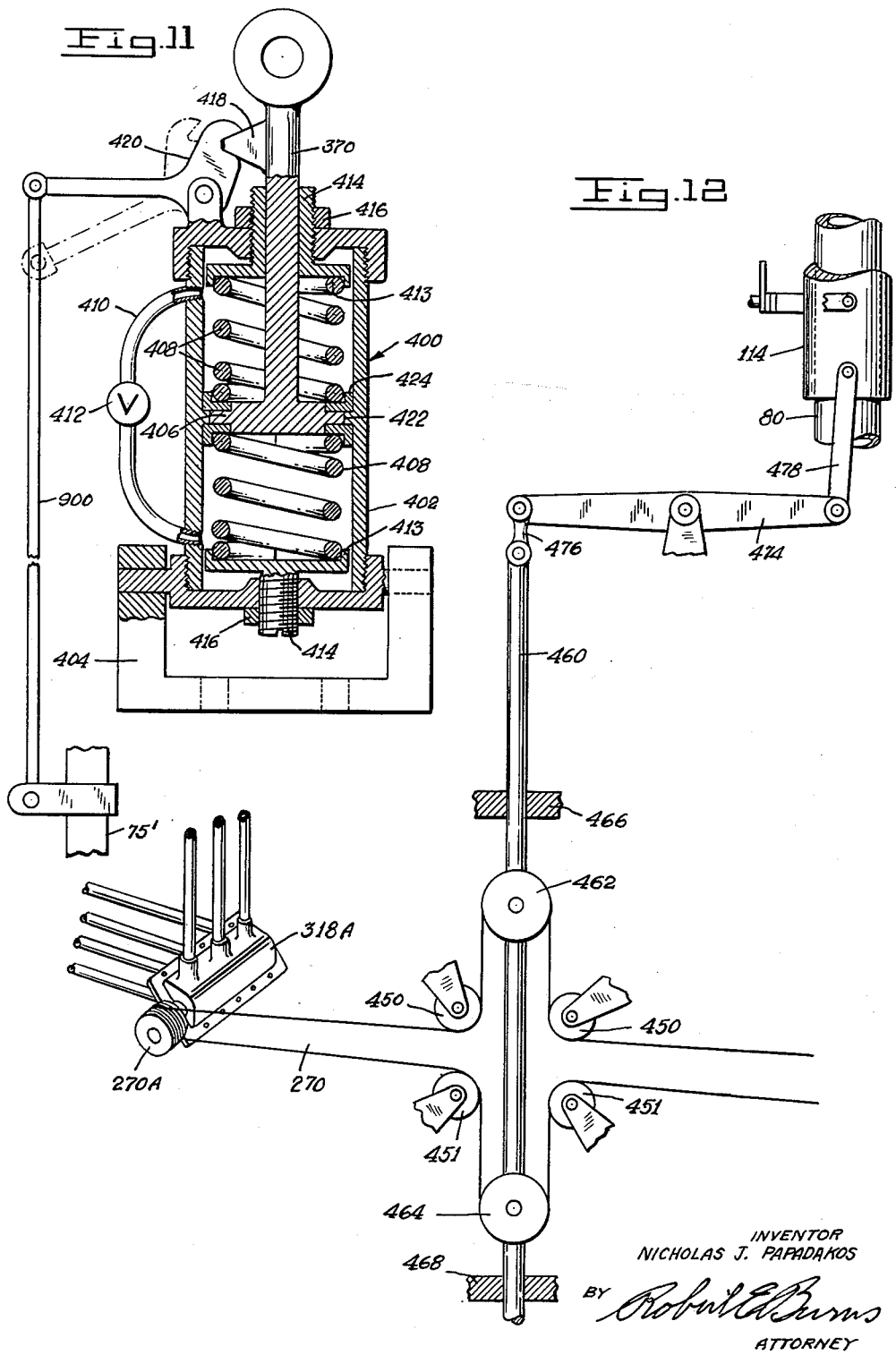

United States Patent Office 2,704,128
Patented Mar. 15, 1955

2,704,128

TAIL ROTOR MOUNTING AND CONTROL MEANS FOR ROTARY WING AIRCRAFT

Nicholas J. Papadakos, Brooklyn, N. Y., assignor to Gyrodyne Company of America, Inc., Flowerfield, N. Y., a corporation of New York Original application February 8, 1947, Serial No. 727,328, now Patent No. 2,629,567, dated February 24, 1953. Divided and this application April 9, 1952, Serial No. 281,320

5 Claims. (Cl. 170—135.75)

This invention relates to aircraft and especially to aircraft of the type having rotary wings.

The present application is a division of application Serial No. 727,328, filed February 8, 1947, now U. S. Patent No. 2,629,567, issued February 24, 1953.

Among the objects of this invention is novel aircraft having improved stability characteristics.

Another object of the invention is novel aircraft which tolerates a comparatively large variation in its center of gravity.

A further object of the invention is novel rotary wing structure and control mechanism having novel co-action producing improved flying results.

A still further object of the invention is novel aircraft control structure for a simplified aircraft operation.

An additional object of the invention is a novel aircraft of high efficiency.

Another object of the invention is novel structural features for aircraft.

The foregoing and other objects of the invention will be best understood from the following description of exemplifications thereof, reference being had to the accompanying drawings wherein:

Fig. 2A is an exaggerated view illustrating the bending rotor blades under load conditions.

Fig. 2B is a diagrammatic representation illustrating some of the principles of rotary wing construction.

Fig. 2C is a diagrammatic view illustrating another principle of rotary wing construction.

Fig. 4A is a fragmentary perspective view of an aircraft control arrangement according to the invention.

Figs. 7 and 8 are enlarged detailed views in perspective of portions of the control arrangement.

Fig. 9 is a vertical sectional view along the line 9—9 of Fig. 10 of rotary governor assembly.

Fig. 10 is a sectional view of the governor construction of Fig. 9 along the line 10—10.

Fig. 11 is a sectional view of a stabilizer unit of the invention.

Fig. 12 is a diagrammatic representation of a control interlinkage feature of the invention.

Fig. 13 is a diagrammatic showing of another control interlinkage feature according to the invention.

Figure 1:
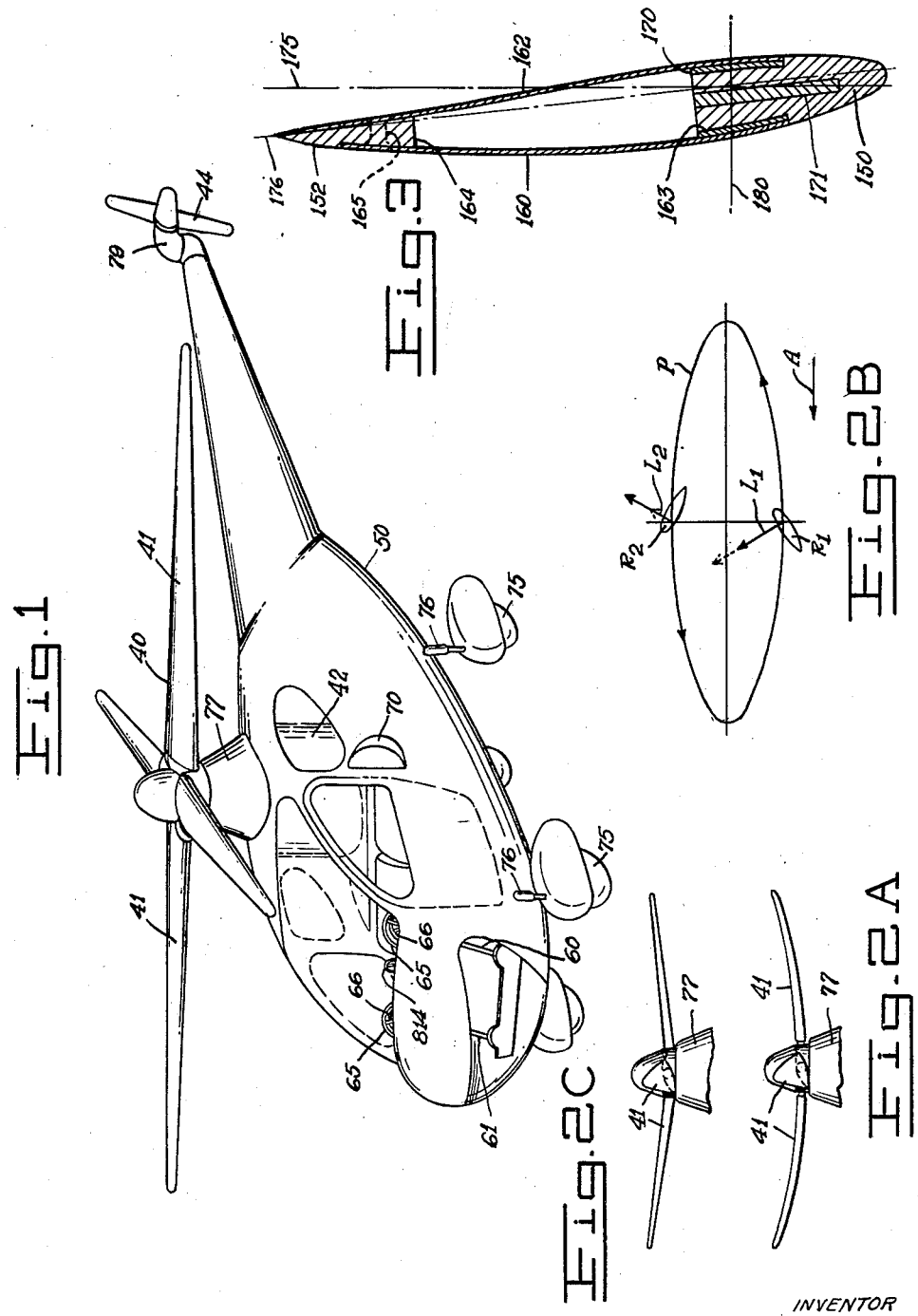
Fig. 1 is a perspective view of one form of rotary winged aircraft according to the invention.

Referring specifically to Fig. 1, there is here shown a rotary wing aircraft in which a four-bladed rotor 40 is connected to and impelled by an engine to provide the essential lifting and translatory forces. No conventional airplane propeller need be provided. The engine may be located within an engine compartment 42 and also connected for actuating a tail rotor 44 to counterbalance the rotational forces imparted to the aircraft fuselage 50 by the operation of the rotor which without counterbalancing would tend to rotate the aircraft around its vertical turning axis.

Controls are provided as indicated below and partly shown in Fig. 1 as including two control columns 60 and 61, each having two hand wheels 65 and 66 mounted at its upper end portion and a central vertically extending wheel 814 mounted for operation by a pilot. The controls are connected so as to produce changes of pitch of the rotor blades 41, either collectively or cyclically as well as changes in tail rotor positioning and tail rotor blade pitch.

Engine ventilating means such as the scoop 70 as well as the alighting gear 75 and transparent observation panels may be provided as shown. Cover structure may be provided around the main rotor hub and shaft as well as around the tail rotor hub and mounting as indicated by the fairing members 77 and 79.

Figure 2:
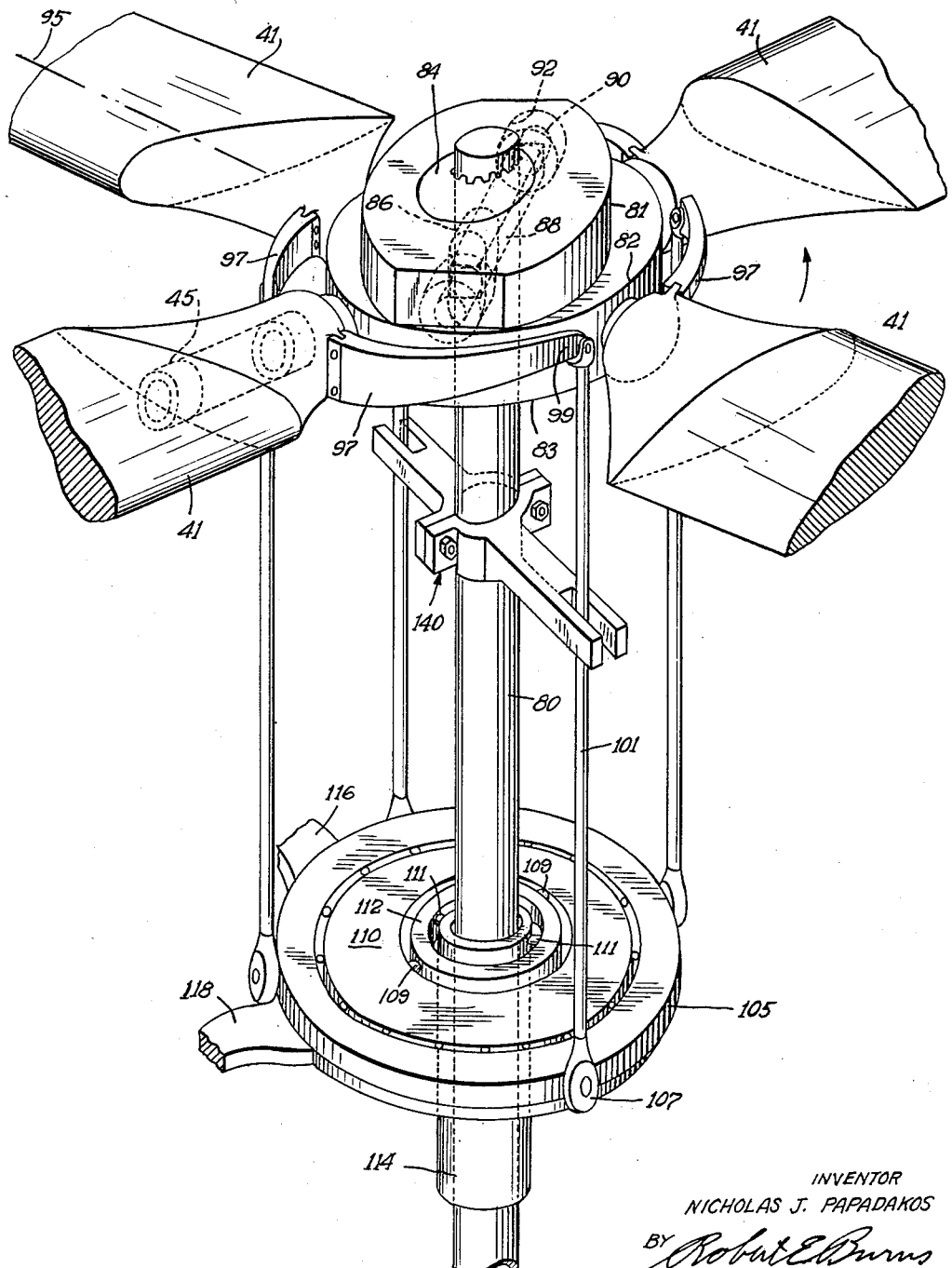
Fig. 2 is an enlarged detail view in perspective of some of the rotary wing constructional and operational details.

Fig. 2 illustrates one form of main rotor construction and control in accordance with the invention. A rotor support 80 which may be in the form of a drive shaft connected with the engine, not shown, is illustrated as holding at its upper portion the main rotor hub 82 in such manner that the hub can rotate with the support 80 and tilt to an appreciable extent in any direction with respect to the support.

The hub is shown as tiltably secured around a spherical pivot 84 which, in turn, is suitably fixed to the support 80 by collars to hold it longitudinally of the support and splines to hold it against relative rotation. To transmit the hub rotating forces to the hub from the supporting shaft 80, the sphere is provided with aligned slots 86, one of which is shown in dotted outline. The upper end of the shaft 80 is also perforated between the slots of the sphere so as to form a continuous passageway for the reception of a driving pin 88. The driving pin which is shown in dotted line as having a transverse cross-section generally square in its intermediate portions, has both its ends 90 of circular cross section projecting from the sphere and suitably journaled in aligned sockets 92 in the hub as by bearings not shown. The passageways 86 through the sphere as well as the aligned passage through the shaft 80 permit the substantial tilting of the pin 88 and for the secure attachment of the hub 82 to the sphere, the hub may be formed of an upper and lower portion 81 and 83 respectively, each internally grooved to fit around the corresponding upper and lower portions of the sphere. The hub portions 81 and 83 may be suitably secured together as by bolts not shown.

The rotor blades 41 are all pivotally supported around the periphery of the hub 82 as by bearings, one of which is shown by the dotted outline 45 so that each blade may rotate around its longitudinal axis indicated by the dot-dash-line 95 while the blades at the same time all rotate around the shaft 80 together with the hub 82.

As shown, the hub is securely anchored to the support shaft 80 but may tilt with respect to the shaft to the extent permitted by the slotted passageway holding the drive pin 88 and the exposed surface of the sphere between the top and/or bottom of the hub and the sides of the shaft 80. The slotted passageway may be made large enough so that tilting around on axis at right angle to the drive pin causes the top and/or bottom of the hub to be stopped by the shaft before the pin is stopped by the top or bottom walls of the passageway.

It is obvious, of course, that in place of the tilting connection shown a gimbal ring construction may be substituted. The illustrated construction has the advantage of necessitating a fewer number of parts and only a single driving pin. Furthermore, the driving pin, which may have any desired shape, may itself be relied on not only for the transmission of rotating forces to the hub but also to prevent the relative rotation of the sphere on the shaft.

The root of each of the rotor blades is illustrated as provided with a control horn 97 extending partially around and spaced from the hub, by which horn the longitudinal rotation of the blade 41 is effected and the rotary position of the blade (i. e. pitch) relative to its longitudinal axis is determined. The outstanding end 99 of each horn 97 is shown as linked by a generally upright connecting member 101 to a control ring 105 rotatably, tiltably and slidably mounted around the shaft 80. Both ends of the connecting link 101 are secured in a manner permitting rotation of the link with respect to the horn 97 and the control ring 105 as required under any conditions of operation.

In operation, the shaft and rotor hub are rotated by the engine in the direction indicated by the arrow and the control ring 105 also rotates correspondingly. To insure the proper rotation of control ring 105, there may be provided additional positive driving means such as one or more outwardly extending yokes 140 clamped to the shaft 80 and slidably engaging connection links 101.

The control ring 105 is shown as rotatably mounted on a non-rotatable plate 110 which, in turn, is tiltably supported by gimbal pins 109, 111 and the gimbal ring 112 on a sleeve 114 slidable on the shaft 80 but not rotatable.

Horns 116 and 118 extending from the plate 110, commonly called the swash plate, in the longitudinal and transverse directions respectively form convenient arms for tilting the swash plate. Such tilting causes the control ring 105 on the plate to tilt correspondingly. The sleeve 114 is provided with means for sliding it along the shaft 80 as shown in Figs. 4A and 8.

Tilting of the ring 105 with respect to the blade hub during rotation effects a rotation or change of pitch of the blades on their longitudinal axis. The change in pitch is cyclical in that, as each blade arrives at that point of the rotor rotation at which the hub has the greatest separation from the ring, the extending end of the blade horn 99 will be pulled down to cause the blade to decrease its pitch. As the rotor rotates further, the separation of the hub and ring decreases and the blade pitch increases, reaching a maximum at the point of minimum separation spaced 180° of rotation from the point of maximum separation. The continued rotation again decreases the blade pitch and completes the cycle. Each blade goes through the same cycle and duplicates the pitch changes of the first blade at exactly the same points at which the first blade goes through these changes, if all other things are maintained constant.

Sliding of the sleeve 114 along the shaft 80 effects a simultaneous movement of all the links 101 so that all the blades change their pitch together by the same amount. If the hub and ring are not tilted with respect to each other, the changed pitch will be maintained throughout the hub rotation cycle.

The provision of four blades on the helicopter rotor is another feature of the invention in that it enables appreciably narrower and thinner blades to be effectively used, and such thinner blades being subjected to less strain may be much more simply and readily manufactured.

Figure 3:
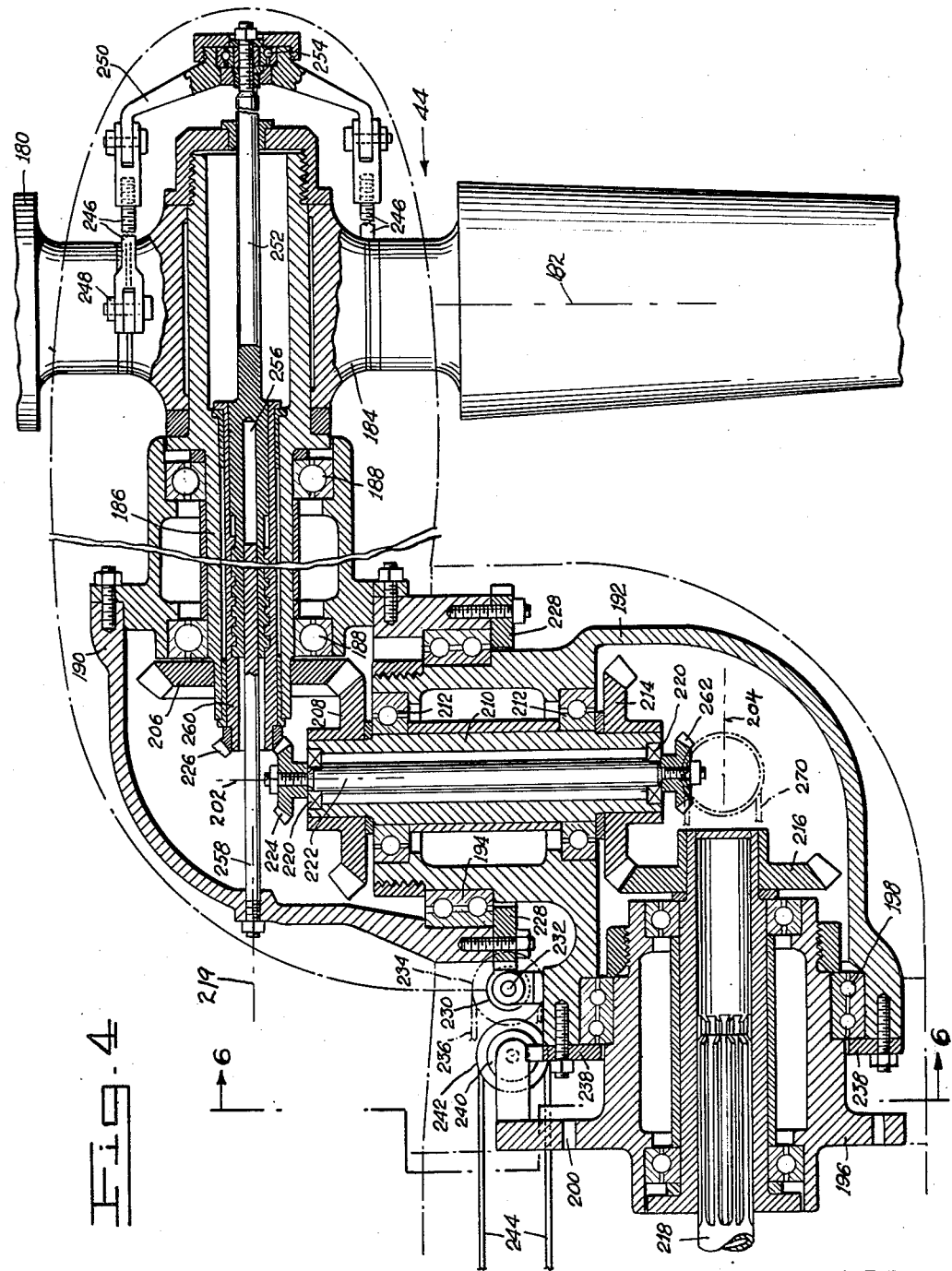
Fig. 3 is a transverse sectional view of one form of rotating wing construction.

Fig. 3 indicates one form of blade construction according to the invention. The blade may have a leading edge former member 150 which may be of suitable rigid construction defining the surface of the leading edge of the blade. A trailing edge former member 152, which may also be of suitable rigid construction defining the surface of the trailing edge of the blade, may be attached to the leading edge former member by transverse reinforcements which may be applied only to the blade ends at the root and tip. The upper and lower surfaces of the blade 160 and 162, respectively, are shown as provided by sheet material according to novel monocoque skin construction. The former members 150 and 152 may, for example, be machined rods provided with seats 163 and 164, respectively, to receive the skins 160 and 162 and apertures for the rivets 165 which may be flush as shown. Doublers 170 may be added in order to facilitate flush riveted construction in the highly stressed areas.

The leading edge former members may be also shaped to receive weighted members such as the balance weight 171 designed to adjust the center of gravity of the blade so that it falls on the longitudinal or pitch axis of the blade which is selected to coincide approximately with the center of lift or pressure of the airfoil section. The elastic axis of the blade may also be made to coincide with the pitch axis by known techniques. The blade is so adjusted that the chord varies in pitch from the root to the tip having a maximum pitch indicated by the dot-dash line 175 at the slow moving root portions and the minimum pitch represented by the dot-dash line at the rapidly moving tip portions. The center of lift is represented by the dot-dash line 181 and may fall about one-fourth of the chord length from the leading edge.

The blades may be of all aluminum construction. The leading edge of the rapidly moving outer span of the blades may be treated to diminish their erosion by rain or other abrading agents. Hard plating, such as of chromium or nickel, or protective surfacing, as by stainless steel, are suitable.

A further feature of the invention is the tilting of all the longitudinal axes of the rotor blades so that the blade tips are elevated above the positions they would occupy if the longitudinal axes all fell in the same plane. As so arranged, the axes of the rotor blades do not rotate in a plane but actually describe a cone-shaped surface of rotation.

This feature is a substantial contribution to the suppression of vibration otherwise caused by the flexing of blades under the influence of the lifting forces generated by them.

This source of vibration called the Coriolis effect is illustrated in Fig. 2B which diagrammatically indicates by the ellipse P the path of rotation of rotor blade elements, as viewed in perspective, two points of which R–1 and R–2 are indicated respectively at diametrically opposite points in the rotation cycle. The arrows L–1 and L–2 represent the normal lifting forces acting on the blades at points R–1 and R–2 as they rotate in the direction of the arrow heads applied to the ellipse. The lifting forces acting at right angles to the blade chord considered together with aerodynamic drag tend to cause upward and rearward flexing of the blades as indicated in exaggerated manner in Fig. 2A and, in the absence of any movement of air with respect to the rotor, the normal lifting forces L–1 and L–2 and their associated deflections are approximately equal not only at the points R–1 and R–2 but at all their points during rotation. However, when there is a relative air movement as indicated by the arrow A in Fig. 2B, the lift produced by the advancing blade at point R–1 is increased as indicated by the dashed extension to arrow L–1. Similarly, the lift of the rotating blade at point R–2 is diminished as indicated by the dashed arrow head applied to arrow L–2. The bending deflection of the rotor blades varies in the same sense as the lift and the net result is that during one half of the rotor revolution the blade tips move more than halfway around the path P while during the other half of the revolution the blades move less than halfway around. This effect is more exaggerated in rotors where the tip moves horizontally in response to pitch control motions and the cyclic and collective pitch axes do not coincide with the longitudinal axis of the blade.

The vibration thus caused may be considerably diminished by the novel arrangement shown in Fig. 2 where both cyclic and collective pitch axes coincide with the longitudinal axis of the rotor blade 95, and thereby no horizontal tip movement takes place with respect to blade pitch axis.

The vibration is also considerably diminished by preconing the blades as shown in Fig. 2C whereby structural deflection is greatly reduced and the bending upwardly due to the lift forces on the blades is opposed by components of centrifugal force which urges the blade elements downwardly to describe a path of maximum radius. Not more than a few degrees of preconing is necessary to reduce the blade deflection to substantially zero.

The reduction of the bending movements due to the preconing develops additional advantages in that lighter hub construction and reduced control forces may be used and longer journal bearing life results.

According to the invention, the turn counterbalancing forces may be applied by a directing structure which is adjustable to give the counterbalancing forces components in either the vertical direction or horizontal direction or in both directions. It is well known that the longitudinal limits of travel of the center of gravity of a single rotor helicopter are very restricted. The center of lift has a longitudinal movement of very small scope and no trimming airfoils are provided. The control of the center of gravity sometimes gets to the point where ballast must be added, removed or shifted, an extremely awkward procedure.

Figure 4:
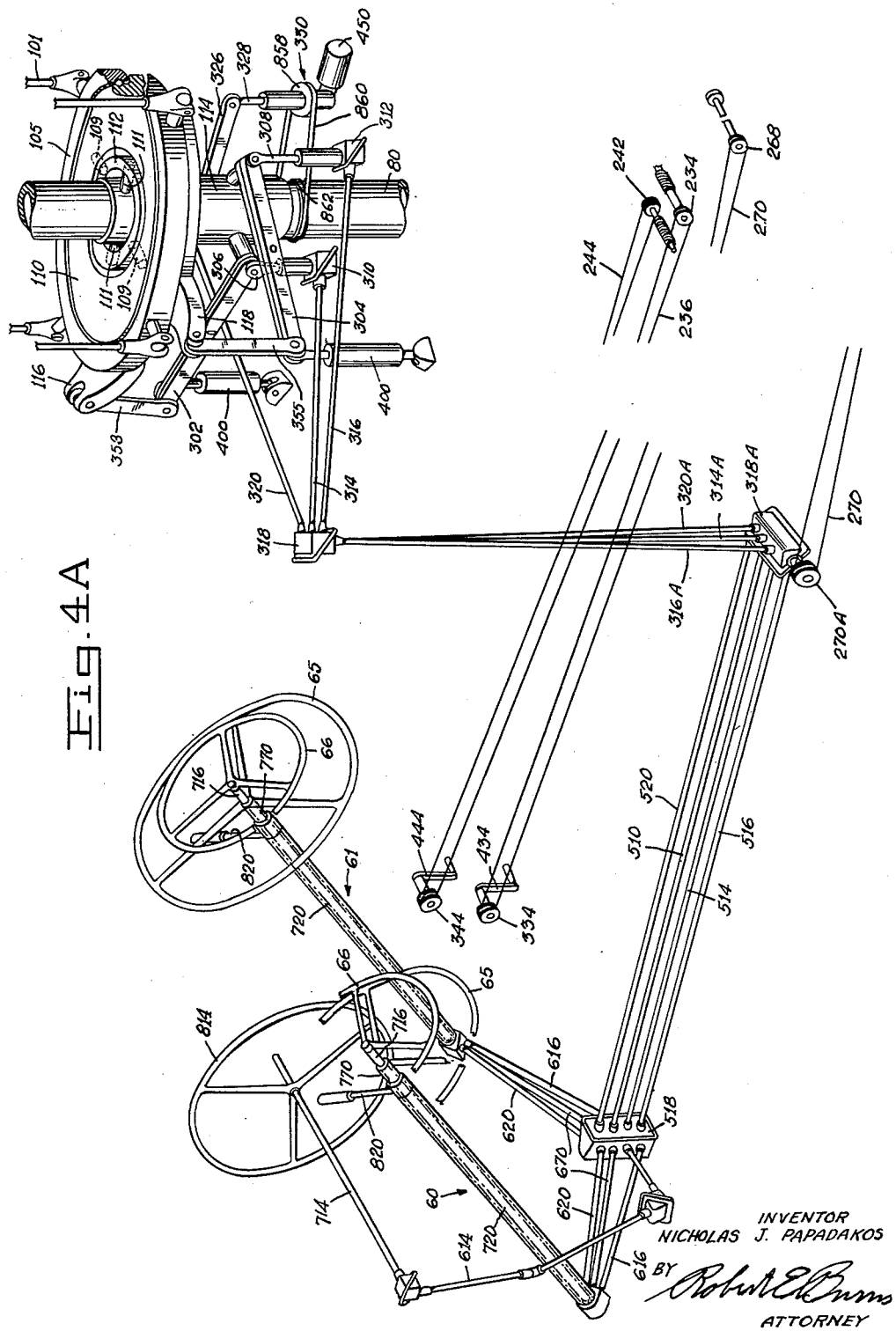
Fig. 4 is a broken sectional view illustrating a tail rotor construction embodying the invention.
Figure 5:
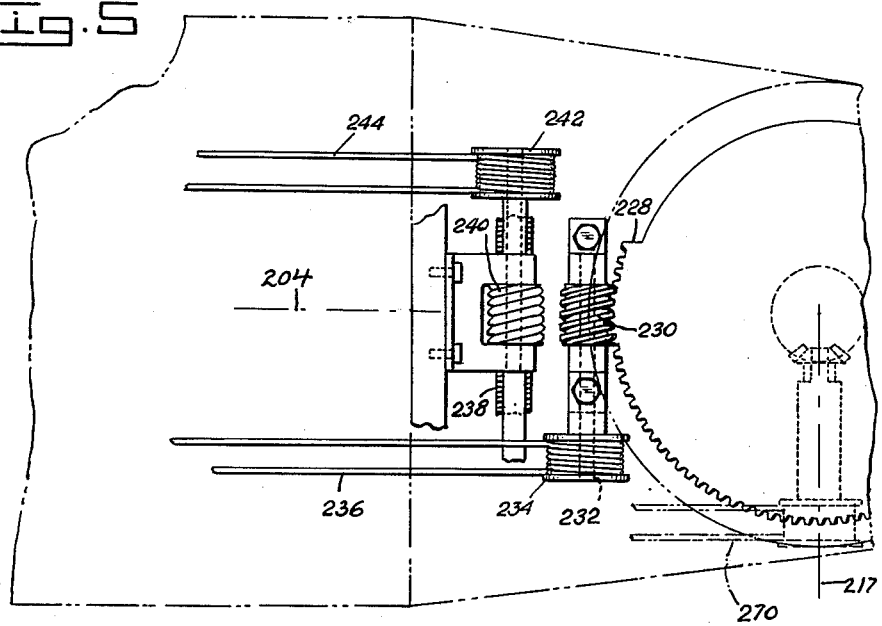
Fig. 5 is a plan view of an operation of the tail rotor controls.
Figure 6:
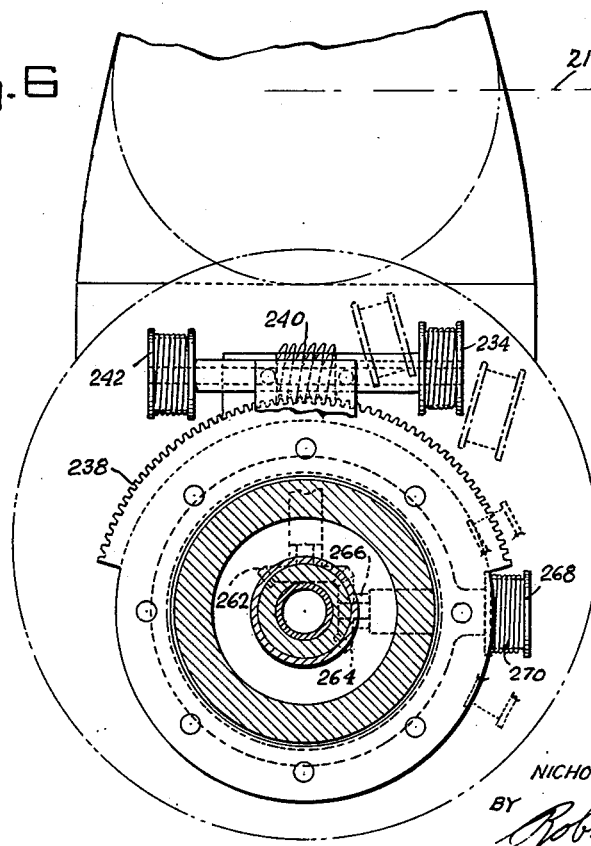
Fig. 6 is a sectional view of Fig. 4 taken along the line 6—6.

Figs. 4 through 6 illustrate one form of tail rotor mounting according to the invention. Tail rotor blades 180 are here shown as pivotally mounted along their longitudinal axes 182 and a hub 184 which in turn is held on a shaft 186 suitably journalled as by bearings 188 in a bell housing 190. The bell housing 190 is shown as journalled to a similar bell housing 192 by bearings 194, the bell housing 192 being journalled to a cylindrical housing 196 by the bearings 198 and the cylindrical housing 196 may be directly attached to the tail portions of the fuselage as by suitable fasteners such as bolts passing through the apertures 200. The bell housing 190 is pivotally arranged by the bearings 194 so as to rotate around the axis 202 of the bell housing 192 and the housing 192 is similarly rotatable around the axis 204 of the housing 196.

The inner end of shaft 186 has affixed a pinion gear 206 which meshes with a similar pinion 208 mounted on one end of a shaft 210 axially mounted in the housing 192 and journalled as by the bearings 212 for rotation around the axis 202. The other end of the shaft 210 contains another pinion gear 214 which meshes with a corresponding pinion gear 216 shown mounted on the end of a shaft 218 which may extend longitudinally through the aircraft for driving connection with its engine.

The rotation of the tail rotor hub and shaft 186 is effected through the pinions 206, 208, 214 and 216 as well as through the shaft 210 so that the rotor hub is positively driven by the drive shaft 218, the shaft 186 being meanwhile rotatable around the axis 202 and the shaft 210 being also rotatable at the same time about axis 204.

The view taken in Fig. 4 is substantially a vertical section along the longitudinal axis of the aircraft and the shaft 186 is shown as directed longitudinally. The turn counterbalancing forces are directed along the axis 219 of the shaft 186 and toward its rotor holding end and it will be recognized, therefore, that in flight the shaft 186 together with its housing 190 will be rotated from the position shown in the figure around the axis 202 to provide a substantial rotor thrust component lateral to the aircraft along the aircraft axis 217, shown in Figs. 5 and 6. Rotation of the housing 190 around the axis 202 is illustrated as controlled by a ring gear 228 secured to the lower end of the housing and meshing with a worm gear 230 held on a shaft 232 suitably journalled on the bell housing 192 more clearly shown in Fig. 5. A control drum 234 is shown as secured to the shaft 232 for engagement with and rotation by a control cable 236 as indicated.

The rotation of bell housing 192 around the axis 204 is shown as similarly controlled, a ring gear 238 being secured to the housing 192 and meshing with a similar worm 240 controlled by control drum 242 and journalled on the fixed housing 196. A second control cable 244 is shown as engaged with the control drum 242 for operation from the pilot's compartment together with cable 236.

Pitch changes of the rotor blades 180 may be effected by providing links 246 having one end connected to crank arms 248 on the blade roots. The other ends of the links 246 are shown as interconnected by a yoke 250 to a pitch rod 252. Rotation of the yoke 250 around the rod 252 is suitably provided for as by the bearing 254 and the inner end of the pitch rod 252 is illustrated as provided with an internal longitudinal passageway 256 of square section slidably engaging the anchored square bar 258 for preventing the rotation of pitch shaft 252 with respect to the housing 190. The external surface of the bar 258 and the internal surface of the passageway 256 may be of any other suitable non-circular complementary cross section. The pitch rod is actuated for longitudinal motion to control rotor blade pitch changes by externally threading its inner end and surrounding it with an internally threaded hollow shaft 260 mounted axially along and rotatably around the axis 219 as shown. The external surface of the pitch rod 252 may be cut away adjacent to its external threads and the inner surface of shaft 260 may be cut away adjacent to its internal threads so as to make it unnecessary to extend the threads along the entire extent of contacting surfaces.

Rotation of shaft 260 is provided for by the small pinion gear 226 affixed to its inner end which meshes with a similar pinion 224 mounted on the upper end of a pitch shaft 222 mounted longitudinally along and rotatably around the axis 202 internally of the hollow shaft 210, as by the bearings 220. The lower end of shaft 222 is provided with another small pinion gear 262 which meshes with an additional small pinion 264 held on a shaft 266 extending laterally through the housing 192 as more clearly shown in Fig. 6.

A third control drum 268 is secured to the shaft 266 where it projects out of the housing 192 and a third control cable 270 is mounted for actuating the drum as shown.

As can be seen from the above construction, rotation of the drum 268 will cause rotation of the pitch shaft 260 which by threaded engagement with the pitch rod 252 will slide the pitch rod longitudinally along the axis 219 after the manner of a jackscrew and thereby cause the rotor blades to change in pitch. The pitch control and the directional controls will operate properly, no matter what the orientation of the individual tail rotor control mounting and directing members. The peripheral dashed-double dot lines surrounding Figs. 4, 5 and 6 merely indicate the external surface of the aircraft which may, for example, be fairing surrounding the tail assembly.

The invention accordingly makes it possible for extreme longitudinal excursions of the center of gravity without rendering the aircraft unstable. Operation of the control cable 244 to cause the rotor thrust axis 219 to pivot around the axis 204 will produce a vertical component of thrust which may be used to move the center of lift to an extent effectively balancing a center of gravity shift of a relatively large order of magnitude.

In the construction illustrated, rotation of the housing 192 around the axis 204 is limited by the movement of the control drum 234 as indicated by the dash-dot outlines. The limit is reached when the drum 234 rotates far enough for the cable 236 to interfere with the cable 244. For more freedom of rotation, the drums 234 and 242 may be mounted at different distances from the axis 204 or both drums may be mounted further apart. Similarly, although Fig. 4 shows the drums 242 and 234 as overlapping in placement along the axis 204, greater freedom may be obtained by separating these drums along this axis.

According to another aspect of the invention, the tail assembly may also be directed so that the thrust axis 219 may be rotated around the axis 202 so as to give the thrust components in the longitudinal direction. In the construction illustrated, this is effected by actuation of the control cable 236 which causes the bell housing 190 to rotate around the bell housing 192 and about the axis 202. Additional forward thrust can thereby be obtained and the aircraft, as a whole, is accordingly more efficient in producing forward flight. Direct thrust by the tail rotor blades is a more efficient method of producing translational flight than the tilting of the main rotor hub support, as the aircraft maintains a more clearly horizontal attitude during forward flight, reducing aerodynamic drag and offering more comfort to the passengers.

According to the invention, it is not necessary to include two directional degrees of freedom in the tail rotor assembly construction. For example, if only the longitudinal balancing control is desired, rotation of bell housing 190 around bell housing 192 may be dispensed with as by eliminating the housing 190 and securing the rotor hub directly to the shaft 210. At the same time, the pitch rod 252 and jackscrew assembly may be substituted for the shaft 222 within the hollow shaft 210. The control drum 234, together with its cable 236 and worm 230, may also be eliminated, leaving an assembly with two controls, one for tail rotor blade pitch and the other for the rotation of housing 192 around the axis 204. As so modified, the construction is similar to that of Fig. 4 without the availability of additional longitudinal thrust components from the tail rotor.

According to another modification, the longitudinal tail thrust may be obtained without the vertical thrust components. For such operation, the apparatus of Fig. 4 may be modified by eliminating the housing 192 and lowering the mounting of shaft 186, together with the pinion 208 and its associated elements, so that the pinion 208 may be directly meshed with the pinion 216 mounted on the drive shaft 218. Pitch control may be effected with this modification by inserting the pitch control pinion 264 within the housing 190 so as to directly mesh with small pinion 226 mounted on the end of shaft 260. The control drum 242 together with its associated elements for rotating the housing 192 may also be eliminated from the modification shown in Fig. 4, leaving a tail rotor assembly having but two controls, one for tail rotor blade pitch and the other for rotation of the rotor thrust around the axis 202.

As another modification, it may be desirable to substitute for the gear linkages illustrated in Figs. 4, 5 and 6 a similar universal joint assembly to accomplish the same purpose and provide a more easily constructed unit.

Fig. 4A illustrates one form of control assembly embodying the invention. The horns 116 and 118 of the swash plate 110 are each shown as linked through different walking beam assemblies 302 and 304 to jackscrew rods 306 and 308 respectively. These jackscrew rods are engaged in jackscrews each connected through junction boxes 310 and 312 and torque tubes 314 and 316 to an upper junction box 318. Also connected to this junction box by a third torque tube 320 and an individual junction box 322 is a third jackscrew 324 pivoted to end 327 of a collective pitch lever 326 as more clearly shown in Fig. 8. Along its intermediate portion, the collective pitch lever 326 is also pivotally affixed to the slidable sleeve 114 as shown. The opposing end 329 of the pitch control lever 326 carries a jackscrew shaft 328 threadedly engaged in a governor assembly 350, one form of which is illustrated in Figs. 9 and 10. The junction boxes 310, 312, etc. may be gear boxes housing pinion gears fixed to the torque tubes and meshing with other gears for transmission of control movements. Other junction connections such as universal joints may also be used if desired.

The walking beam assemblies 302 and 304 may each be substantially identical and include depending links 353 and 355 connecting the horns 116, 118 with one end 357 of one walking beam of a pair of walking beams 360, 361 having similar dimensions and pivoted together on a floating pin 364 (Fig. 7).

The beam 360, pivotally secured at one end 357 to the link 355, also carries, at its other end 358, the jackscrew rod 308. The beam 361 has one end, 366, pivotally secured to the sleeve 114 and has its other end 368 pivotally connected to stabilizing unit 400 as by means of the rod 370. The stabilizing unit may be a hydraulic cylinder such as illustrated in Fig. 11.

Fig. 11 shows a hydraulic unit 400 including a cylinder 402 trunnioned on a support 404 and containing a piston 406 slidably mounted within the cylinder 402 and affixed to the rod 370. The cylinder may contain any suitable hydraulic fluid and is shown as also containing a pair of springs 408 which resiliently urge the piston 406 to a neutral rest position. The portions of the cylinder on both sides of the piston are shown as interconnected by a conduit 410 containing a needle valve 412 for determining the rate at which the hydraulic fluid and the piston move in response to forces exerted by the rod 370. The needle valve and conduit may, of course, be placed in the piston or wall of the cylinder, if desired. The tension of the springs 408 is also shown as adjustable under the control of the spring holders 413, which may be shifted in their position within the cylinder 402 by means of threaded stems 414, and lock nuts 416. Fixed to the piston rod 370 of the stabilizing unit is shown a locking projection 418 which may engage with a locking lever 420 which may be manually or automatically operated to lock the piston in neutral position and prevent its movement in the stabilizing unit. To assist in fixing a neutral position, the cylinder 402 is shown as provided with an inwardly directed shoulder 422 and the piston is provided with spring cups 424. The spring cups 424 are large enough to be stopped by the shoulder 422 so that each spring can only urge the piston as far as its neutral position and no further. Only one spring is moved from its neutral position at any one time. The stabilizing unit support 404 may be held to the fuselage together with the governor 350 and the gear boxes.

As shown in Fig. 4A, the upper gear box 318 is connected to a lower gear box 318A by means of the three torque tubes 314A, 316A and 320A, which torque tubes are geared to the corresponding torque tubes 314, 316 and 320 respectively. The lower gear box 318A is also provided with an outwardly extending control drum 270A which is engaged by the control cable 270. The drum 270A is connected, through gears not shown, to a torque tube 570, extending from the lower gear box 318A to a forward gear box 518 together with torque tubes 514, 516 and 520 geared to the tubes 314A, 316A and 320A. From the forward gear box 518 two pairs of torque tubes, each pair including the tubes 616, 620 and 670, branch out and are connected to the bases of two control columns 60 and 61 as shown. The control columns each have an external, hollow control shaft 720 connected at its base through gears not shown to a control tube 620. Coaxially held within the shaft 720 are two other control shafts 770 and 716. Each shaft 770 is connected at its bottom which may extend below the lower end of shaft 720, to a tube 670 and at its top to a hand wheel 65. The shaft 716 is connected at its bottom, which may extend lower than the other shafts, to the tube 616 and its top is provided with a hand wheel 66. The top of the outer shaft 720 is provided with an arm 820. All the shafts are rotatable by means of their upper controls around their longitudinal axes. The fourth control tube 514 is connected to a control shaft 714 by intermediate linkage 614 which may be offset, as shown, for placement along one side of the fuselage so as not to unduly obstruct the pilot compartment. The shaft 714 may be horizontally mounted and equipped with a hand wheel 814 extending in a generally vertical plane within easy reach of a pilot vested before either of the control columns.

As indicated, the hand wheel 814 controls operation of the tube 314 through the intermediary connections, 714, 614, 514 and 314A, and the gear boxes 518, 318A and 318 and thereby operates the jackscrews 306 to raise or lower the end 358 of the beam 360 of the walking beam assembly 302. With the stabilizing rod 370 locked or not moving for any other reason and with the sleeve 114 also stationary, the pin 364 of the walking beam assembly 302 will remain relatively fixed and raising or lowering of the end 358 of beam 360 will lower or raise respectively the connecting link 353 thereby tilting the swash plate 110 in a fore and aft direction around the lateral gimbal pins 109. If the stabilizer rod 370 and/or the sleeve 114 are not stationary, their movements will effect the movement of link 353 in a manner permitting simultaneous control movements and stabilizer action.

In similar manner, the upper hand wheels 66 also control the tilting of the swash plate 110 in a lateral direction around the longitudinal gimbal pins 111.

The lower hand wheels 65 which, as shown, may be of larger diameter than the upper wheels for unobstructed access, control the collective pitch of the tail rotor blades through the intermediate control members 770, 670, 570, 270A, 270, 268 and the junction boxes 518 and 318A.

The jackscrew 324 of the collective pitch lever 326 is shown as connected for operation by the hand lever 820 through the intermediate control members 720, 620, 520, 320A, 320, and the junction boxes 518, 318A and 318. Although the control connections 314, 316, 320, 514, 516, 520, 570, etc. are shown as tubes for transmission of control movements by axial rotation, other suitable control members may be used. For example, these members may be solid rods or a cable system interlinking the pilot controls with the swash plate and/or the tail rotor.

The governor 350 (Fig. 9), also connected to the collective pitch lever 326, is shown as provided with a pulley 858 for reception of a belt 860 (Fig. 8) driven by a pulley 862 provided on the rotor shaft 80. The governor is also provided with an impelling means 430 which may be an electric motor interconnected to control the position of a jackscrew 328 in accordance with the relative speed of the impelling means 430 and the pulley 858. According to the construction shown in Figs. 9 and 10, the governor includes an external housing 864 in which is suitably journaled an internally threaded hollow shaft 866 as by means of the bearings 868. Secured to the lower end of the shaft 866, as by means of a threaded cap 870, is a pulley hub 372 which may be keyed as by means of key 374 to positively cease rotation of the hub 372 with the shaft 866. Around the pulley hub 372 is an annular pulley ring 376 supported in place by overhanging ears 378 suitably held as by bolts 380. Driving forces are transmitted between the pulley ring and the hub 372 by means of the rollers 382 urged as by springs 384 against grooves 386 in the periphery of the pulley hub. The springs 384 are illustrated as retained in place within the pulley ring by means of the set screws 390. Within the internally threaded hollow shaft 866 is an externally threaded hollow jackscrew shaft 328 which threadedly engages the hollow shaft 866 and, in turn, is internally splined as indicated at 392 for driving connection with the splined shaft 394 mounted internally of the jackscrew shaft. The lower end of shaft 394 is shown as engaged with and driven by the power means 430 and the upper end of the jackscrew shaft 328 is shown as suitably journalled as by bearing 396 in a rod 398 which may be pivotally engaged with the collective pitch lever 326 through an intermediate link 399, as shown in Fig. 8.

The power unit 430 may be an electrically driven motor equipped with reducing gears for operation by a battery to produce a substantially constant speed rotation of the shaft 394. The internally threaded shaft 866 is driven by the rotor shaft 80 through the pulley 858 in the same direction as the central shaft 394. A stop 401 may be provided within the housing of the governor to limit the downward travel of the jackscrew 328. The lower end of the thread on the outer surface of the jackscrew shaft 328 may be discontinued at some distance from the end of this shaft and the engaging threads of the shaft 866 may extend downwardly only part of the height of shaft 866 so as to provide an upper stop for limiting the upward travel of the jackscrew along the threads of shaft 866.

In operation, the governor assembly will adjust the collective pitch of the main rotor blades so that the rotor tends to rotate at a predetermined constant speed. The main rotors of helicopters are ordinarily designed to obtain ultimate efficiency at a specific R. P. M. and it is desirable to maintain that R. P. M. under varying conditions of flight maneuvers and engine power. The automatic governor, according to the invention, relieves the pilot from continuously making adjustments of the collective pitch and throttle setting to maintain the constant R. P. M. desired in use.

When the control jackscrew 324 is not operated so that it keeps the end 327 of the collective pitch lever 326 in a fixed position, the governor assembly 350 will, by pivoting the collective pitch lever around the fixed end 327, raise or lower the sleeve 114 and thereby adjust the collective pitch of the main rotor blades to obtain constant speed rotor rotation. Should the constant speed means 430 fail in flight, the rotation of shaft 394 will be immediately slowed and in an attempt to slow the rotation of shaft 80 to correspond, the jackscrew 328 will be raised to its upper limiting position where it will be stopped by the upper limit stop and permit continued torque to unseat the rollers 382 from the pulley hub 372 and permit further rotation of the annular pulley ring 376. The governor is not damaged by this action and the sudden increase in rotor pitch will warn the pilot of the misoperation, by a sudden increase in upward rate of climb of the aircraft. The pilot thus warned can then continue flight by manually operating the lever 820 which causes the jackscrew 324 to raise or lower the end 327 of the collective pitch lever 326 by pivoting it around its other end 329 which will now be fixed in place by the torque of the pulley 858 keeping the jackscrew 328 against its upper limit stop.

Failure of this kind will not be serious even if occurring at low altitudes since the sudden increase in upward rate of climb provides an extra margin of altitude to compensate for pilot reaction time.

Failure of the ship's engine on the other hand causes the rotation of motor shaft 80 to immediately slow down and the governor automatically lowers the jackscrew 328 to decrease the collective pitch of the main rotor blades in an attempt to increase the rotor speed. After the jackscrew reaches its lower limit stop, continued rotation of the shaft 394 will keep the pulley hub turning and will again cause unseating of the rollers 382 from the grooves 386 to also permit harmless slipping of the pulley ring on its hub. Such action automatically adjusts the rotor blade pitch to minimum pitch, the optimum setting for auto-rotation thereby automatically preventing the stalling of the rotor blades, a highly important safety feature.

Starting of the constant speed motor 430 may be arranged to be automatically effected when the ship's engine is started. During such engine-starting period there may also be a difference in speed between the shaft 80 and the impelling means 430 for a sufficient time to cause the governor screw 328 to move to a limit stop and slipping of the pulley ring on its hub. When the ship's engine and the motor 430 have arrived at equilibrium conditions, however, the rollers 382 will again seat and the governor will function properly.

It is obvious, however, that other arrangements such as conventional friction clutches may be used for permitting slippage and rotation of the rotor shaft 80 with respect to the impelling means 430 and such disengageable connection may be interposed between the impelling means 430 and the shaft 394. Similarly, other constant speed-maintaining techniques may be used, as, for example, a differential gear assembly in which one side gear is driven by the rotor shaft, another side gear by a constant speed motor and a cage holding the side gears interconnected through one or more transverse gears being connected to operate the collective pitch lever 326 in response to the difference in speed of the side gears. Other constant speed devices such as the conventional constant speed airplane propeller constructions including those that do not require a constantly running auxiliary constant speed motor are also suitable.

A very desirable feature of the pitch control mechanism, according to the invention, is that the action of the governor does not depend on the position of the governor jackscrew 328 which will be different for different amounts of power delivered by the engine and absorbed by the rotor. Axial movement of the jackscrew 328 depends only on the relative speeds of shaft 80 and impelling means 430 and may be controlled by changing the screw pitch to substantially eliminate hunting.

The swash plate tilt controls of the invention are so arranged that sliding of the sleeve 114 causes vertical movement of the swash plate as a whole, together with simultaneous and identical vertical movement of the ends 366 of each walking beam 361. In the absence of changes in the positions of control jackscrews 306 and 308 and the stabilizer units 400, the floating pins 364 will act as pivots for a "lazy tongs" action of the walking beam assemblies 302, 304 to vertically move the ends 357 of the walking beams 360 in a manner identical with the movement of the swash plate. The tilting of the swash plate will therefore remain substantially unchanged.

If vertical movement of the sleeve 114 is accompanied by additional changes in the positions of the control jackscrews or the stabilizer units, the swash plate is subjected to these additional corresponding changes substantially as of no vertical sleeve movement takes place.

Undesired slight tilting of the swash plate may be caused by the vertical movement of the sleeve 114 in that the vertical movement of the end 357 of each walking beam 360 is actually a pivotal movement around the floating pivots 364 which in turn pivot around ends 366 of beams 361 and this pivoting does not correspond with the pivoting of the upper ends of links 353, 355 around the gimbal pins 109, 111, respectively. The lack of similarity in the pivoting necessitates a tilting of the links 353, 355 as they move vertically and, accordingly, a tilt in the swash plate. This undesired swash plate tilting is only a second-order effect and may be rendered substantially imperceptible by suitable selection of pivot points and lever arms within the normal rotor pitch range. As an added refinement, the second-order tilting may be avoided as by limiting the links 353, 355 to a purely vertical motion without accompanying tilt and permitting horizontal adjustment at other points in the controls. By way of example, the links 353, 355 may have their longitudinal axes directed vertically and may be slidably retained between vertical surfaces which are horizontally shiftable but not tiltable from the vertical. Automatic horizontal adjustment of ends 366 of the beams 361 and/or the ends 357 of the beams 360 may be permitted by providing horizontal slots on the sleeve fastenings and links 353, 355 for the pivot pins of these beam ends to slide in.

For suitable operation of aircraft, it is important that the aircraft have an equilibrium position and that any displacement from the equilibrium position automatically produce a correcting tendency which opposes the disturbance and tends to return the aircraft to its equilibrium position. It is also important that the correcting tendency should not have a magnitude large enough to produce an over-correcting opposite displacement as large or larger than the original displacement, since a return to the equilibrium position will then be almost impossible even with expert handling of the aircraft controls. If operation of such unstable aircraft is at all possible, it is only by continuous operation of the controls, a difficult and fatiguing job.

On the other hand, properly stable aircraft are simple to fly for long periods of time and even without touching any of the controls.

In helicopter constructions, inherent instabilities must be overcome. If rotor blade pitch controls are rigidly fixed to the fuselage, any deviation of the rotor shaft from the vertical during hovering produces a restoring force which is large enough to cause an over-correction larger than the original deviation. These over-corrections lead to oscillations that rapidly build up in amplitude and become unmanageable. This type of instability is more completely described and analyzed in the article by Kelley in the December 1945 issue of the SAE Journal (Transactions), vol. 53, No. 12, pp. 685–690.

If the helicopter is on the ground, however, and the rotor blade pitch controls are loosely secured to the fuselage, a gust of wind tends to cause a rotating rotor hub to tilt or flap by increasing the relative angle of attack and lift of the blades during the portion of the rotor rotation in which they advance into the wind while decreasing the relative angle of attack and lift of the blades retreating from the wind. If the loosely held blade pitch controls do not apply prompt correcting forces, the hub may tilt in such a manner as to strike the shaft 80 or engage it with sufficient force to upset the aircraft.

Another aspect of the invention is the provision of novel rotor blade controls that are rigidly held to the fuselage while the aircraft is on the ground and are yieldably held on the fuselage during flight to an extent permitting a delay in the adjustment of the rotor rotation in response to disturbances. The delay in adjustment permits tilting of the rotor hub caused by a disturbance to be gradually corrected without the generation of an unstable or over-correcting tilting force.

According to the invention, the rigid and yieldable rotor blade control is established by the stabilizing units 400.

When the ship rests on the ground just prior to take-off or just after landing, its rotating rotor is susceptible to tilting or flapping by winds as indicated above. In order to provide stability during such conditions, the stabilizing units are locked as by engagement of the lock members 418 and 420 (Fig. 11). This fixes the position of the pivot pins 364 inasmuch as the control screws 306 and 308 are not operated by the pilot controls. The swash plate accordingly becomes rigidly positioned on the shaft 80 and the rotor can therefore be considered of the mast-dependent type. If a gust of wind now strikes the rotor, the hub tends to tilt in a manner raising the upwind blades because of their increased lift. However, the blade horns 97 attached to connecting links 101, which are fixed against vertical movement, cause the uptilted blades to rotate around their longitudinal axes and decrease their pitch. The loss of lift suffered by the pitch decrease counteracts the lifting tendency of the wind and keeps the rotor hub substantially fixed against such disturbances.

An important feature of this invention is the fact that the control horn 97 of each blade extends a sufficient distance to space the pivot points of the horn by a distance which subtends less than 90° of hub rotation arc. This feature makes for a simple and sturdy linkage, having only a small number of parts and so connecting the blades 41, the hub and the swash plate that tilting of the hub causes cyclic pitch changes as each blade comes to the tilted portion of the hub. It should be noted that the rising or falling of a set of blades at the tilted portions of the hub changes only its own pitch and does not affect the other blades.

When the ship becomes airborne, the stabilizing lock members 418 and 420 are disengaged and the swash plate becomes flexibly or yieldably positioned to the shaft 80 through the stabilizing units. When a gust of wind strikes the rotor during hovering flight, the upward blades will again have a tendency to rise due to their increased lift.

The resistance offered by the stabilizing units tends to produce blade pitch changes in a manner similar to those that take place when the stabilizer units are locked. However, frictional forces such as those in the rotor blade bearings and rotor blade inertia resist the pitch changes and tend to cause the swash plate to become parallel to the rotor hub and thus produce a rotation-plane-dependent rotor system. The opposing forces cause the swash plate to only partially follow the rotor hub tilt and also cause the rotor hub to follow the swash plate tilt and to recover from the disturbances as the swash plate is returned to its undisturbed position by the stabilizing units.

The rotor system according to the invention may accordingly be considered as neither rotation-plane-dependent nor mast-dependent but actually as swash-plate-dependent. For small disturbances, the rotor is almost but not completely rotation-plane-dependent and the stabilizing units damp out any swinging oscillations to effect the dynamic stability referred to above. As the severity of the disturbances increases, the rotor system becomes increasingly mast-dependent, producing more complete feathering correction when it is necessary. The yieldability of the stabilizing units is adjustable, being a function of its various parameters such as the needle valve setting, the size of rotor, etc.

The locking members 418 and 420 of the stabilizing units may be manually operable or may be connected for automatic operation, as for example by connecting movable lock member 420 to one or more of the alighting gear 75. Such landing gear may be secured to the fuselage through yieldable shock absorber structures 76 which permit appreciable yieldable movement of the landing gear toward and away from the fuselage in a manner well known. In flight, the landing gear generally occupies a position most distant from the fuselage. On the ground, however, the weight of the fuselage and associated structures causes the shock damping structures 76 to permit the landing gear 75 to move and occupy a position closer to the fuselage. A cable or control linkage 900 may be connected between the movable lock members 420 of the stabilizing units and a portion 75' of one or more of the landing gear 75 or a portion of the shock absorber structure 75 which is fixed to and moves with the landing gear. As so arranged, the pilot is relieved of manually controlling the stabilizer locks and the locks may be mounted so as to be immune from inadvertent or accidental operation. The locking members may also be arranged as by suitable shaping so that a positive locking operation, as for example the manual or automatic operation described above, automatically forces the stabilizer rod 370 to its neutral locking position to provide greater safety should a gust strike the ship as it is about to alight and the stabilizer rod is temporarily displaced from neutral.

The aircraft may, according to the invention, be equipped with float gear for alighting on water instead of land. The same automatic locking of the stabilizing units may be provided for with any type of alighting gear.

In the above arrangement, the stabilizing units 400 and the jackscrews 306 and 308 are connected to the swash plate through the walking beam assemblies 302 and 304 respectively. Other connecting arrangements may also be adapted. For example, the stabilizing units 400 may be mounted directly on sleeve 114 with their axes horizontally positioned and each end 370 pivotally connected to a substantially horizontal yoke which incorporates the jackscrew 306 or 308 also mounted in a horizontal plane. The swash plate horns 116, 118 may extend vertically downward and pivotally connect to the internally threaded member of the jackscrew. In this arrangement, the jackscrews 306 and 308 may be rotatably connected to the gear box 318 by means of flexible shafting so as to allow flexing as well as lengthening or shortening of the connection as the sleeve 114 slides up or down along the shaft 80.

Additionally, the stabilizing arrangements of the invention may be incorporated in aircraft having main rotor feathering controls of any other type. The so-called "delta hinge effect" produced by suitable linkage to change the blade feathering to correct for rotor flapping does not in general result in stable aircraft without the stabilizing dampers.

Attention is especially directed to the fact that the main rotor assembly shown in Fig. 2 consists of a minimum number of parts so that the possibility of failure in flight is considerably diminished and construction is greatly simplified. Members transmitting major forces may be made short and strong.

Another feature of the invention is the cockpit controls. The basic control movements of the helicopter are:

a. Fore or aft tilting of the rotor plane around a lateral axis. This is caused by a corresponding tilt of the swash plate which produces cyclic pitch and lift changes of the rotor blades, the lift changes, being unsymmetrical, produce the tilt. The fore or aft tilt of the rotor plane causes forward or aft acceleration of the helicopter respectively.

b. Lateral tilting of the rotor plane around a longitudinal axis. This is produced by corresponding tilting of the swash plate to effect cyclic pitch and lift changes of the rotor blades similar to those described above. The lateral tilt of the rotor plane produces acceleration of the helicopter to the right or to the left.

c. Collective pitch changes of the main rotor blades. This is produced by changing the power output of the ship's engine to the rotor hub, as for example by changing the throttle setting. As the power changes, the rate of rotation of the rotor hub tends to change and the governor 350 adjusts the collective pitch to maintain the rate of rotor rotation constant. The collective pitch changes of the main rotor blades cause symmetrical lift changes and ascent or descent of the helicopter.

d. Collective pitch changes of the tail rotor blades. These are produced by movement of the pitch rod 252 as by rotation of the control drum 268. Tail rotor collective pitch changes produce variations in the amount of tail rotor thrust so that the turning tendency inherent in a single rotor helicopter is either exactly counterbalanced or is inadequately or excessively counterbalanced. Excessive or inadequate counterbalancing causes rotation of the helicopter around its vertical turning axis in one direction or another.

According to the invention, however, the following additional controls are provided for operation by the pilot:

e. Pivoting of the tail rotor shaft around the longitudinal axis. This may be effected by rotation of the control drum 242 which, as shown in Fig. 4A, may be connected by its cable 244 to a similar control drum 344 mounted in the pilot's compartment for rotation as by the crank 444. Tilting of the tail rotor shaft in this manner gives the tail rotor thrust vertical components which may be used for balancing the aircraft and providing longitudinal stability.

f. Tilting of the tail rotor shaft around the vertical axis. This may be effected by rotation of the control drum 234 which, as also shown in Fig. 4A, may have its cable connecting it with a similar drum 334 mounted in the pilot's compartment for rotation as by the crank 434. Such azimuthal pivoting may be employed to impart additional forward speed to the aircraft when desired and increases its efficiency.

Difficulties are encountered if helicopter pilot controls are made to emulate airplane controls such as by providing control sticks and/or pedals in the pilot's compartment for operation by the pilot. As a result of limitations as to available space and the travel of the pilot's arms and feet, the stick and pedal movements are relatively small and require relatively high control forces and high sensitivity. The high control sensitivity makes it necessary for the pilot to continually use his hands and feet in flight. Pilot fatigue is quickly induced.

According to the invention, the pilot is relieved of the strain of continually using his hands and feet and the forces necessary to operate the controls as well as the control sensitivity may be reduced to such an extent that any or all of the controls will remain in any desired setting without having to be held there by the pilot.

Fig. 4A illustrates one form of such control arrangement. The main controls are there shown as hand wheels for operation in a manner similar to that used in an automobile.

Fore and aft control is obtained by rotation of the wheel 814. This wheel may be mounted so that only its upper rear portion is available and forward movement of the available portion causes forward acceleration of the aircraft while rearward movement causes rearward acceleration.

The lateral control is obtained by rotation of either of the upper hand wheels 66. The wheels may be so linked that, from the pilot's point of view, clockwise wheel rotation produces acceleration to the right and counterclockwise wheel rotation, acceleration to the left.

Vertical movement may be obtained by operation of the engine throttle which is not illustrated but may be mounted between the control columns 60, 61 in a manner conventionally used in airplanes. Since the engine throttle is ordinarily operated by the application of only light forces and is easily set and maintained in place, conventional airplane throttle and controls may be used without adding to pilot's discomfort. Such use in fact makes helicopter operation simpler for airplane pilots who are taught that opening the throttle to increase the engine power is the proper procedure for gaining altitude and closing the throttle to diminish the engine power the proper procedure for losing altitude.

The engine throttle may alternatively be mounted overhead and/or arranged so that upward movement of the throttle produces upward acceleration of the aircraft and downward movement of the throttle downward acceleration of the aircraft.

In addition, a foot throttle may be provided similar to that used in an automobile for the convenience of persons familiar with automobile controls but not accustomed to aircraft. An additional advantage of the foot throttle is that it frees the pilot's hands from the performance of this function.

Steering control may be obtained by operation of either of the lower hand wheels 65. These wheels may be so connected that clockwise wheel rotation produces clockwise aircraft rotation and counterclockwise wheel rotation produces counterclockwise aircraft rotation.

Longitudinal balancing may be obtained by operation of the crank 444 which may be conveniently placed between the control columns 60 and 61, as for example by being suspended from the top of the fuselage within easy reach of a pilot sitting at either of the controls. Conventional airplanes are also equipped with a longitudinal balancing control similarly positioned so that airplane pilots will have less difficulty becoming accustomed to the helicopter controls.

In addition to, or in place of, the manual controls, automatic control means may be provided, such as by use of conventional automatic gyro pilot, to maintain the ship in a level altitude under all conditions and thus relieve the pilot of a control function.

The extra efficiency contributed by the rearward pivoting of the tail rotor shaft may be obtained by the operation of the crank 434 which, since it is not often used, may be placed within not too easy reach, as for example suspended from the top of the fuselage alongside or to the rear of the other overhead controls.

If desired, the cable drum 234 movement may be interconnected and coordinated with the movement of the wheel 814 so that forward rotation of the wheel 814 not only causes forward tilting of the swash plate 110 but also rotates the tail rotor thrust axis 219 aft about axis 202, thus relieving the pilot of an additional function.

Fig. 13 illustrates one form of such interlinkage connection in accordance with the invention. One of the fore-and-aft swash plates tilt control members such as 514, 414 or 314 may be externally threaded as indicated at 550 to engage an internally threaded block slidably mounted as on a fixed guide 554 so as to move longitudinally of the control member, as the control member is rotated. A surface of the block 552 is shown as provided with gear teeth 556 to form a rack engageable by a pinion gear held on a shaft rotatably mounted on a fixed axis and also holding the tail rotor azimuth control drum 334. The rack on the sliding block is so disposed with respect to the pinion gear that the rack teeth disengage from the pinion before the azimuthal rotation of the tail rotor thrust axis proceeds far enough in the forward direction to cause the tail rotor blades to strike the fuselage. The rearward rotation of the thrust axis may also be limited in the same manner to ensure the presence of turn counterbalancing torque.

The pitch of the thread 550 may be varied along its length, as by providing the internal control member-engaging surface of the block 552 with a guide pin instead of a continuous thread. Such thread pitch variation enables the adjustment of the tail rotor direction with the fore-and-aft swash plate tilt in accordance with a non-linear relation.

As another phase of the invention, the pilot controls may be further simplified by interconnecting the steering control so as to automatically compensate for changes in the vertical control of the aircraft. Vertical control changes affect the amount of power absorbed by the main rotor and thereby change the turning tendency that is to be balanced by the tail rotor. With an interlinking of the collective pitch of the tail rotor blades with the vertical control, it becomes possible for the pilot to change the vertical movement of the aircraft by operating only a single control rather than by the simultaneous operation and coordination of two different controls.

Fig. 12 illustrates one form of such control interconnection in accordance with the invention. As illustrated, fixed guide pulleys 450 and 451 may be provided for the tail rotor collective pitch cable 270. Transversely of the cable 270 is shown an interlink bar 460 holding two pulleys 462 and 464 as slidably mounted between guides 466 and 468. The interlink bar 460 may be operated by the sliding movements of the sleeve 114 through an interlink lever 474 and the pivoted connecting bars 476 and 478 as shown. The control cable 270 is shown as looped around the interlink pulleys 462 and 464 between the fixed pulleys so that transverse movement of the interlink bar causes one length of the cable, as for example the upper length, to have a longer loop around pulley 462 while the corresponding loop of the other length of the cable 270 is shortened. Such actuation causes the cable 270 to rotate its control drum 268 without affecting its control drum 270A. Accordingly, sliding of the sleeve 114 which accompanies any change in total lift of the main rotor also causes a change in the amount of thrust produced by the tail rotor.

The interlink lever 474 may also be used to establish the interlink connection around the ship's engine which is usually directly below the rotor shaft 80 and would interfere with a direct vertical interlink connection. The length and the positioning of the connecting bars 476, 478 and the pivot point of the lever 474 may be adjusted to provide for non-linear interlinkage between the lift changes and the tail rotor thrust changes, if desired.

Other types of interlinking connections may be used in place of that shown, as, for example, a flexible push-pull cable sliding in and guided by a fixed flexible sheath. Additionally, the interlinkage may be provided between the tail rotor collective pitch cable 270 and the ship's engine, if desired. The tail rotor collective pitch interlinking does not interfere with longitudinal balancing effected by the vertical tilting of the tail rotor shaft. If the center of gravity is longitudinally displaced from the center of main lift and this displacement is balanced by a vertical component of the tail rotor thrust, any change in the main lift will necessitate a similar change in the upper thrust of the tail rotor. By suitable interlinkage the tail rotor thrust is increased or decreased in a manner similar to the changes of the main thrust.

It will be observed that the pilot controls as indicated above may be so arranged that control movements are easily effected and are made in a manner most people are naturally accustomed to, either by previous experience driving automobiles or piloting airplanes.

It will be apparent to those skilled in the art that the novel principles of the invention disclosed herein in connection with specific exemplifications thereof will suggest various other modifications and applications of the same. It is accordingly desired that in construing the breadth of the appended claims they shall not be limited to the specific exemplifications of the invention described above.

What I claim and desire to secure by Letters Patent is:

1. In a helicopter, a fuselage having a rearwardly extending tail structure, a drive shaft extending rearwardly in said tail, an elbow-shaped housing rotatably mounted on the rear end of said tail so as to turn about the axis of said drive shaft, a driven shaft rotatably supported by said elbow-shaped housing and disposed at an angle to said drive shaft, a second elbow-shaped housing rotatably supported by the first mentioned elbow-shaped housing so as to turn about the axis of said driven shaft, a second driven shaft rotatably supported by said second elbow-shaped housing at an angle to the first mentioned driven shaft, a rotor connected to and driven by said second driven shaft, driving connections between all of said shafts and means for turning said elbow-shaped housings about their respective axes and for holding them in the positions to which they are turned.

2. In a helicopter, a fuselage having a hollow boom projecting approximately horizontally from the fuselage, a drive shaft extending longitudinally of said boom, a hollow elbow rotatably mounted on the end of said boom so as to turn about the axis of said drive shaft, a driven shaft rotatably supported by said elbow and disposed at an angle to said drive shaft, a second hollow elbow rotatably supported by the first mentioned hollow elbow so as to turn about the axis of said driven shaft, a second driven shaft rotatably supported by said second elbow and disposed at an angle to the first mentioned driven shaft, a rotor connected to and driven by said second driven shaft, driving connections between all of said shafts, a worm gear on each of said elbows concentric with the axis of rotation of the respective elbow, a worm on said boom meshing with the worm gear on the first mentioned elbow, a worm on the first mentioned elbow meshing with the worm gear on said second elbow and means for turning said worms.

3. In a helicopter, a fuselage, a boom projecting approximately horizontally from the fuselage, a drive shaft extending longitudinally of said boom, a hollow elbow rotatably mounted on the end of said boom so as to turn about the axis of the drive shaft, a driven shaft rotatably supported by said elbow and disposed at an angle to said drive shaft, intermeshing bevel gears on said shafts to transmit power from said drive shaft to said driven shaft, a second hollow elbow rotatably supported by the first mentioned hollow elbow so as to turn about the axis of said driven shaft, a second driven shaft rotatably supported by said second elbow and disposed at an angle to the first mentioned driven shaft, intermeshing bevel gears on said driven shafts to transmit power from the first mentioned driven shaft to said second driven shaft, a rotor connected to and driven by said second driven shaft, and means for turning said elbows about their respective axes and for holding them in the positions to which they are turned.

4. In a helicopter, a fuselage, a boom projecting approximately horizontally from the fuselage, a drive shaft extending longitudinally of said boom, a hollow elbow rotatably mounted on the end of said boom so as to turn about the axis of the drive shaft, a driven shaft rotatably supported in said elbow and disposed at an angle to said drive shaft, a second hollow elbow rotatably supported on the first mentioned elbow so as to turn about the axis of said driven shaft, a hollow rotor shaft rotatably supported in said second elbow and disposed at an angle to said driven shaft, driving connections between all of said shafts, a rotor mounted on and driven by said hollow rotor shaft, said rotor having a hub portion and blades mounted on said hub portion so as to turn about their longitudinal axes to vary the pitch of the blades, pitch control means comprising means extending through said hollow shaft and connected to said blades to control the pitch of said blades, and means for turning said elbows about their respective axes and for holding them in the positions to which they are turned.

5. In a helicopter, a fuselage, a boom projecting approximately horizontally from said fuselage, a drive shaft extending longitudinally of said boom, a hollow elbow rotatably mounted on the outboard end of said boom so as to turn about the axis of the drive shaft, a hollow intermediate shaft rotatably supported in said elbow and disposed at an angle to said drive shaft, intermeshing bevel gears on said shafts to transmit power from the drive shaft to said intermediate shaft, a second hollow elbow rotatably supported by the first mentioned elbow so as to turn about the axis of said intermediate shaft, a hollow rotor shaft rotatably supported in said second elbow and disposed at an angle to said intermediate shaft, intermeshing bevel gears on said intermediate and rotor shafts to transmit power from said intermediate shaft to said rotor shaft, a rotor mounted on and driven by said hollow rotor shaft, said rotor having a hub portion and blades mounted on said hub portion so as to turn about their longitudinal axes to vary the pitch on the blades, pitch control means comprising a pitch control shaft extending through said hollow intermediate shaft, means for turning said pitch control shaft, a rotatable member coaxial with said hollow rotor shaft and having a screw-threaded portion, intermeshing bevel gears on said pitch control shaft and said rotatable member, a longitudinally reciprocable, non-rotatable member in said hollow rotor shaft, said reciprocable member having a threaded portion engaging the threaded portion of said rotatable member so as to be reciprocated by the rotation of said rotatable member, means connecting said reciprocable member and said blades so as to vary the pitch of the blades by the reciprocation of said member, and means for rotating said elbows about their respective axes and for holding them in the positions to which they are turned.

References Cited in the file of this patent

UNITED STATES PATENTS

| | | |
|---|---|---|
| 2,378,617 | Burke | June 19, 1945 |
| 2,385,889 | Skavinsky | Oct. 2, 1945 |
| 2,496,624 | Heintze | Feb. 7, 1950 |
| 2,600,930 | Sikorsky | June 17, 1952 |
| 2,644,634 | Jensen | July 7, 1953 |